US005154215A

United States Patent [19]

Safranek

[11] Patent Number: 5,154,215

[45] Date of Patent: Oct. 13, 1992

[54] ROUTER BIT WITH REPLACEABLE KNIFE

[75] Inventor: Leland Safranek, Atascadero, Calif.

[73] Assignee: Safranek Enterprises, Inc., Atascadero, Calif.

[21] Appl. No.: 760,526

[22] Filed: Sep. 12, 1991

[51] Int. Cl.[5] ........................ B27G 13/00; B23B 51/00

[52] U.S. Cl. .................................... 144/219; 144/218; 144/241; 407/34; 407/53

[58] Field of Search ............... 144/218, 219, 240, 241; 407/34, 38, 42, 48, 53, 54

[56] References Cited

U.S. PATENT DOCUMENTS

| | | | |
|---|---|---|---|
| 2,517,374 | 8/1950 | Amon | 144/219 |
| 3,344,497 | 10/1967 | Osborne | 144/219 |
| 4,132,493 | 1/1979 | Hosoi | 407/53 |
| 4,655,648 | 4/1987 | Hellbergh | 407/42 |
| 4,733,995 | 3/1988 | Aebi | 407/34 |
| 5,039,259 | 8/1991 | Duncan | 407/34 |

*Primary Examiner*—W. Donald Bray
*Attorney, Agent, or Firm*—Daniel C. McKown

[57] ABSTRACT

A router bit body has an open center space that permits plunge cutting and that facilitates the ejection of chips from the router bit body. The knife is screwed to a sloping knife-supporting plane surface that underlies and reinforces the knife and that reduces the stresses in the mounting screw. The knife-supporting plane surface lies in a plane through which the angle of rotation passes obliquely.

3 Claims, 1 Drawing Sheet

FIG. 3
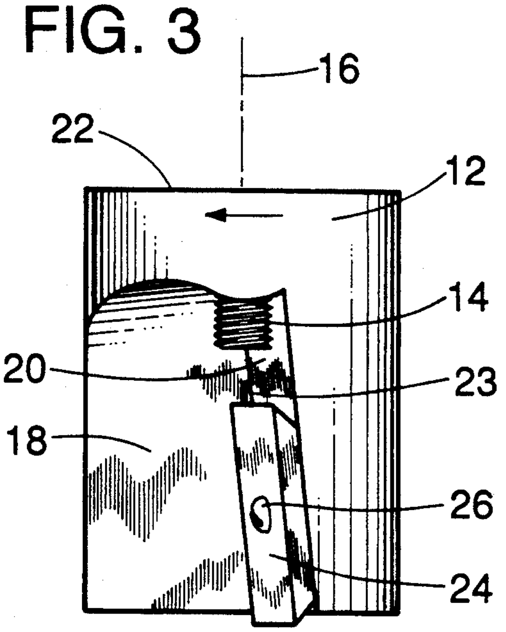
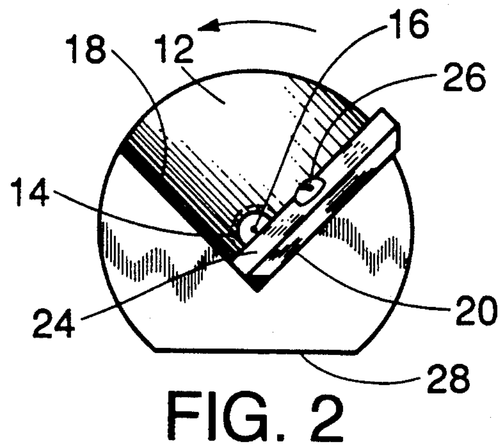
FIG. 2
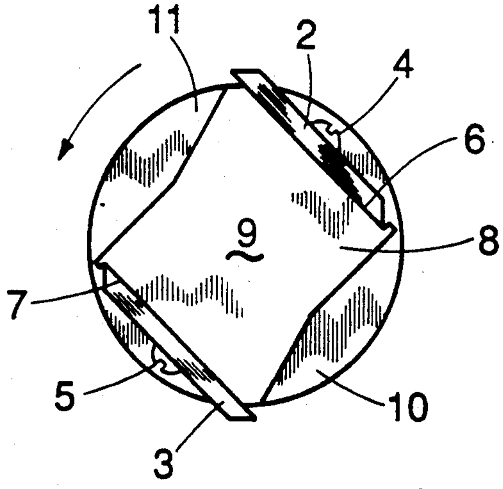
FIG. 1
(PRIOR ART)
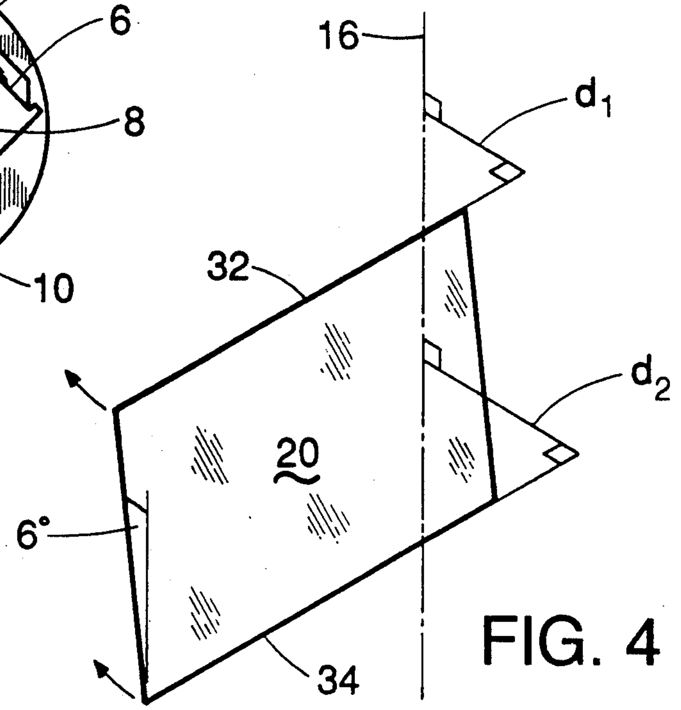
FIG. 4

ROUTER BIT WITH REPLACEABLE KNIFE

BACKGROUND OF THE INVENTION

The present invention is in the field of cutters and particularly relates to a router bit for cutting wood, plywood, particle board and the like, and which has a replaceable knife.

In accordance with the present invention, the knife is attached by a screw to a knife-supporting surface on the router bit body so that the knife-supporting surface truly supports the knife during cutting.

FIG. 1 shows a router bit of the prior art having a pair of replaceable knives 2 and 3 which are removably attached by the screws 4 and 5 respectively to opposed flats 6 and 7 respectively on the router bit body 8. The space between the flats 6 and 7 is occupied by the land 9 that projects toward the viewer in FIG. 1. The relieved areas 10 and 11 are intended to permit the chips to move out of the cutting area.

The prior art router bit of FIG. 1 has several design flaws which the present invention seeks to remedy.

Because of the way the knives 2 and 3 of FIG. 1 are attached, all of the stress of cutting is borne by the screws 4 and 5 alone.

The center land 9 prevents the router bit of FIG. 1 from being used for plunge cutting into the face of a work piece. Further, the land 9 occupies space which could otherwise be utilized for the egress of chips.

These problems of the router bit of the prior art are overcome by the router bit of the present invention.

SUMMARY OF THE INVENTION

In accordance with the present invention, the router bit body is provided with a knife-supporting surface that supports the knife in use.

The router bit body has an open construction that provides ample volume to permit the chips to move readily out of the cutting area, thereby reducing friction. The reduced friction causes less heat, which results in less wear on the cutting edge, thus extending its life.

The router bit of the present invention has no solid center portion, and therefore can be used for plunge cutting.

These and other advantages of the router bit of the present invention will be made clear below through reference to the drawings, which are included to show an exemplary embodiment of the invention, but which are not intended to limit the invention.

BRIEF DESCRIPTION OF THE DRAWINGS

FIG. 1 is a bottom plan view of a router bit known in the prior art;

FIG. 2 is a bottom plan view of a router bit in a preferred embodiment of the present invention;

FIG. 3 is a side elevational view of the router bit of FIG. 2; and,

FIG. 4 is a diagram showing the orientation of the knife support surface in the preferred embodiment.

DETAILED DESCRIPTION OF THE PREFERRED EMBODIMENT

FIGS. 2 and 3 show a preferred embodiment of the present invention, and FIG. 4 is a diagram used to describe the geometry of it.

The router bit body of the present invention includes a cylindrical upper portion 12, the axis of which coincides with the axis 16 of rotation. A threaded bore 14 enters the cylindrical upper portion 12 from the upper end 22 and is concentric with the axis 16.

The lower portion of the router bit body includes a plane surface 18 and a knife-supporting surface 20 which intersect along the line 23 that is neither coaxial with the axis 16 nor parallel to it. The knife 24 is drawn flush against the knife-supporting surface 20 by the screw 26.

A flat 28 removes weight from the side of the router bit body opposite the space between the surfaces 18 and 20 for the purpose of statically balancing the router bit body with respect to the axis 16. The router bit rotates in the direction shown by the arrows in FIGS. 2, 3 and 4.

As can be seen from FIGS. 2 and 3, the space including between the surfaces 18 and 20 is ample for efficient chip removal.

Because of its importance to the operation of the present invention, the geometry of the knife-supporting surface 20 will now be described in detail with reference to FIG. 4. The knife-supporting surface is represented for purposes of illustration in FIG. 4 as a transparent plane 20 that contains a first line 32 and a second line 34 that is parallel to the first line 32. The lines 32 and 34 may be considered to be the upper and lower edges of the knife-supporting surface 20. The first line 32 lies in a plane that is perpendicular to the axis 16 of rotation, and the second line 34 lies in a second plane that is parallel to but spaced axially from the first plane. The knife-supporting plane 20 is inclined at a 6 degree angle from the vertical in the preferred embodiment.

In the preferred embodiment, the router bit body is composed of steel, and the knife 24 is composed of carbide.

In the preferred embodiment, the knife 24 has a square face bounded by four cutting edges each 12 millimeters in length. Thus, when one of the cutting edges has become dull, the knife may be removed by unscrewing the screw 26 and the knife may then be rotated 90 degrees to bring into operation a fresh cutting edge. When all cutting edges have become dull, the entire knife may be replaced.

With reference to FIG. 4, when the distance $d_1$ is less than the distance $d_2$, the knife is said to have a reverse helix angle, and when the distance $d_1$ is greater than $d_2$, the knife is said to have a positive helix knife angle.

Thus, there has been described a router bit body for use with a replaceable carbide knife, and which includes a knife-supporting surface that orients the knife in a desired orientation with respect to the angle of rotation. The knife-replaceable carbide knife, and which includes a knife-supporting surface that orients the knife in a desired orientation with respect to the angle of rotation. The knife-supporting surface lies under the knife, thereby reinforcing it. The router cutter of the present invention has an open center construction that facilitates the departure of chips from the cutter, thereby prolonging knife life. Because the router bit body of the present invention has no center structure, it can be used for plunge cutting.

The foregoing detailed description is illustrative of one embodiment of the invention, and it is to be understood that additional embodiments thereof will be obvious to those skilled in the art. The embodiments described herein together with those additional embodiments are considered to be within the scope of the invention

What is claimed is:

1. A router bit for rotation about an axis, and particularly adapted for cutting wood, plywood, and particle board, said router bit comprising:

a unitary body including an upper end (22) lying in a first plane that is perpendicular to the axis (16);

a lower end lying in a second plane perpendicular to the axis and spaced from said first plane;

a knife-supporting surface (20) lying in the plane that contains a first line (32) and a second line (34) that is parallel to the first line, where said first line (32) lies in a third plane that is perpendicular to the axis and intermediate said first plane and said second plane, said first line (32) spaced a distance $d_1$ from the axis (16), and where said second line (34) lies in said second plane and is spaced a distance $d_2$ from the axis (16), the width of said knife-supporting surface (20) in the direction of the first line (32) at least equal to the maximum radial dimension of said unitary body from the axis (16);

no part of said unitary body lying in front of said knife-supporting surface (20), whereby said unitary body has an open center that enables the router bit to be used for plunge cutting and that provides ample space for chip removal;

said unitary body statically balanced about the axis (16), whereby the router bit may be rotated at the relatively high speeds preferred for cutting wood, plywood and particle board;

said router bit further including a knife (24) and removable means (26) for fastening said knife flush against said knife-supporting surface, whereby as said router bit is rotated about the axis during cutting, said knife is forced against said knife-supporting surface which reinforces said knife.

2. The router bit body of claim 1 in which $d_1$ is less than $d_2$, resulting in a reverse helix knife angle.

3. The router bit body of claim 1 in which $d_1$ is greater than $d_2$, resulting in a positive helix knife angle.

* * * * *